US010286495B2

(12) United States Patent
Uchida et al.

(10) Patent No.: US 10,286,495 B2
(45) Date of Patent: May 14, 2019

(54) METHOD OF DETERMINING QUALITY OF CLADDING LAYER AND LASER BUILD-UP APPARATUS

(71) Applicant: TOYOTA JIDOSHA KABUSHIKI KAISHA, Toyota-shi, Aichi-ken (JP)

(72) Inventors: Keisuke Uchida, Nagoya (JP); Hideki Teshima, Miyoshi (JP); Akinori Eda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 15/183,423

(22) Filed: Jun. 15, 2016

(65) Prior Publication Data

US 2017/0014953 A1 Jan. 19, 2017

(30) Foreign Application Priority Data

Jul. 14, 2015 (JP) ................................ 2015-140329

(51) Int. Cl.
*B23K 26/34* (2014.01)
*B23K 26/03* (2006.01)
(Continued)

(52) U.S. Cl.
CPC .......... *B23K 31/125* (2013.01); *B23K 26/032* (2013.01); *B23K 26/34* (2013.01); *B23K 26/702* (2015.10); *G06T 2207/30164* (2013.01)

(58) Field of Classification Search
CPC ...... B23K 26/24; B23K 26/34; B23K 26/342; B23K 26/032; B23K 31/125; B23K 26/702; G06T 2207/30164; G06T 2207/30136
See application file for complete search history.

(56) References Cited

U.S. PATENT DOCUMENTS 7,586,061 B2 * 9/2009 Hoebel ................ B23K 26/032 148/525
2008/0314878 A1 * 12/2008 Cai ....................... B22F 3/1055 219/121.62

(Continued)

FOREIGN PATENT DOCUMENTS

| | | | |
|---|---|---|---|
| JP | H09-192861 A | | 7/1997 |
| JP | 2002-048718 A | | 2/2002 |
| JP | 2012-192436 A | * | 10/2012 |

OTHER PUBLICATIONS

Tolochko et al., "Balling Processes during selective laser treatment of powders", Feb. 2004, Emerald Group Publishing LTD, vol. 10, Issue 2, pp. 78-87.*

*Primary Examiner* — Geoffrey S Evans
(74) *Attorney, Agent, or Firm* — Oliff PLC

(57) ABSTRACT

A method of determining a quality of a cladding layer according to one aspect of the present invention is a method of determining a quality of a cladding layer 16 formed by irradiating a laser beam 30 while a metallic powder 26 is being supplied, the method including: a process of capturing an image of a melt pool 31 and an area around thereof while the cladding layer 16 is being formed; a process of measuring the sizes and the number of ball-shaped metallic powder aggregates absorbed in the melt pool 31 from the image that has been captured; and a process of determining the quality of the cladding layer 16 based on the sizes and the number that have been measured.

6 Claims, 11 Drawing Sheets

(51) Int. Cl.
*B23K 31/12* (2006.01)
*B23K 26/70* (2014.01)

(56) References Cited

U.S. PATENT DOCUMENTS

| | | | | |
|---|---|---|---|---|
| 2010/0140236 | A1* | 6/2010 | Cai | B23K 26/03 219/121.72 |
| 2010/0176097 | A1* | 7/2010 | Zhu | B23K 26/03 219/121.63 |
| 2011/0259858 | A1* | 10/2011 | Wappler | B23K 26/032 219/121.64 |
| 2013/0309420 | A1* | 11/2013 | Flesch | B22F 3/1055 427/591 |
| 2015/0177158 | A1* | 6/2015 | Cheverton | G01N 15/0227 700/119 |
| 2016/0114431 | A1* | 4/2016 | Cheverton | B23K 26/342 219/76.1 |
| 2016/0151859 | A1* | 6/2016 | Sparks | B23K 26/034 219/121.62 |
| 2016/0224017 | A1* | 8/2016 | Huang | B22F 3/1055 |

* cited by examiner

X (TOTAL NUMBER) $= C1 \times N1 + C2 \times N2 + C3 \times N3 + \cdots$ ( $C_i$ : WEIGHT COEFFICIENT BY SIZE
(COEFFICIENT BECOMES LARGER AS
SIZES OF BALLS BECOME LARGER)

$N_i$ : NUMBER )

METHOD OF DETERMINING QUALITY OF CLADDING LAYER AND LASER BUILD-UP APPARATUS

INCORPORATION BY REFERENCE

This application is based upon and claims the benefit of priority from Japanese patent application No. 2015-140329, filed on Jul. 14, 2015, the disclosure of which is incorporated herein in its entirety by reference.

BACKGROUND OF THE INVENTION

1. Field of the Invention

The present invention relates to a method of determining a quality of a cladding layer and a laser build-up apparatus, and relates to, for example, a method of determining a quality of a cladding layer for a valve seat and a laser build-up apparatus for the valve seat.

2. Description of Related Art

A laser cladding process (so-called a laser cladding method) that irradiates a laser beam while a metallic powder is being supplied to form a cladding layer is used, for example, to form a valve seat of a cylinder head.

Japanese Unexamined Patent Application Publication No. 09-192861 discloses an apparatus in which the intensity of light emitted from a melt pool in the laser cladding process is observed by a plurality of optical sensors and the presence or the absence of an abnormality in the cladding layer is determined.

The present inventors have found that holes (blow holes) are generated when excess metallic powder (excess powder) deposited at the front of the direction in which a melt pool moves aggregates, the state of the excess metallic powder becomes a semi-molten one since a laser beam comes close to it, the excess metallic powder becomes balls (ball-shaped metal aggregates) having a relatively large size, and then the balls are absorbed in the melt pool. In the apparatus disclosed in Japanese Unexamined Patent Application Publication No. 09-192861, only the intensity of the light emitted from the melt pool is observed and a function of detecting the above ball-shaped metal aggregates, which generates such holes, is not included. Therefore, it is impossible to accurately determine the quality of the cladding layer.

The present invention has been made in order to solve the above problem and aims to provide a method of determining a quality of a cladding layer and a laser build-up apparatus capable of accurately determining the quality of the cladding layer.

SUMMARY OF THE INVENTION

A method of determining a quality of a cladding layer according to one aspect of the present invention is a method of determining a quality of a cladding layer formed by irradiating a laser beam while a metallic powder is being supplied, the method including: a process of capturing an image of a melt pool and an area around thereof while the cladding layer is being formed; a process of measuring the sizes and the number of ball-shaped metallic powder aggregates absorbed in the melt pool from the image that has been captured; and a process of determining the quality of the cladding layer based on the sizes and the number that have been measured.

According to this configuration, it is possible to accurately predict the occurrence of the hole due to the ball-shaped metallic powder aggregates based on the sizes and the number of the ball-shaped metallic powder aggregates that have been measured, whereby it is possible to accurately determine the quality of the cladding layer.

Further, it is preferable that an optical axis of the laser beam that illuminates the melt pool be made coincident with an optical axis of light to capture the image of the melt pool and the area around thereof. According to this configuration, it is possible to capture the whole image of the melt pool and the area around thereof.

A laser build-up apparatus according to one aspect of the present invention includes: a supply part that supplies a metallic powder; and a laser oscillator that outputs a laser beam, in which: a cladding layer is formed by irradiating the laser beam while the metallic powder is being supplied from the supply part, the laser build-up apparatus further includes: an image-capture unit that captures an image of a melt pool and an area around thereof; and a measurement unit that measures the sizes and the number of ball-shaped metallic powder aggregates absorbed in the melt pool from the image that has been captured, and a quality of the cladding layer is determined based on the sizes and the number of the metallic powder aggregates.

According to this configuration, it is possible to accurately predict the occurrence of the hole due to the ball-shaped metallic powder aggregates based on the sizes and the number of the ball-shaped metallic powder aggregates that have been measured, whereby it is possible to accurately determine the quality of the cladding layer.

Further, it is preferable that a nozzle having a central axis be further included and an optical axis of the laser beam that illuminates the melt pool and an optical axis of light to capture the images of the melt pool and the area around thereof coincide with the central axis. According to this configuration, it is possible to capture the whole image of the melt pool and the area around thereof.

According to the present invention, it is possible to provide a method of determining a quality of a cladding layer and a laser build-up apparatus capable of accurately determining the quality of the cladding layer.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, embodiments of the present invention will be described. However, the present invention is not limited to the following embodiments. For the clarification of the description, the following description and the drawings are simplified as appropriate.

First Embodiment

Figure 1:
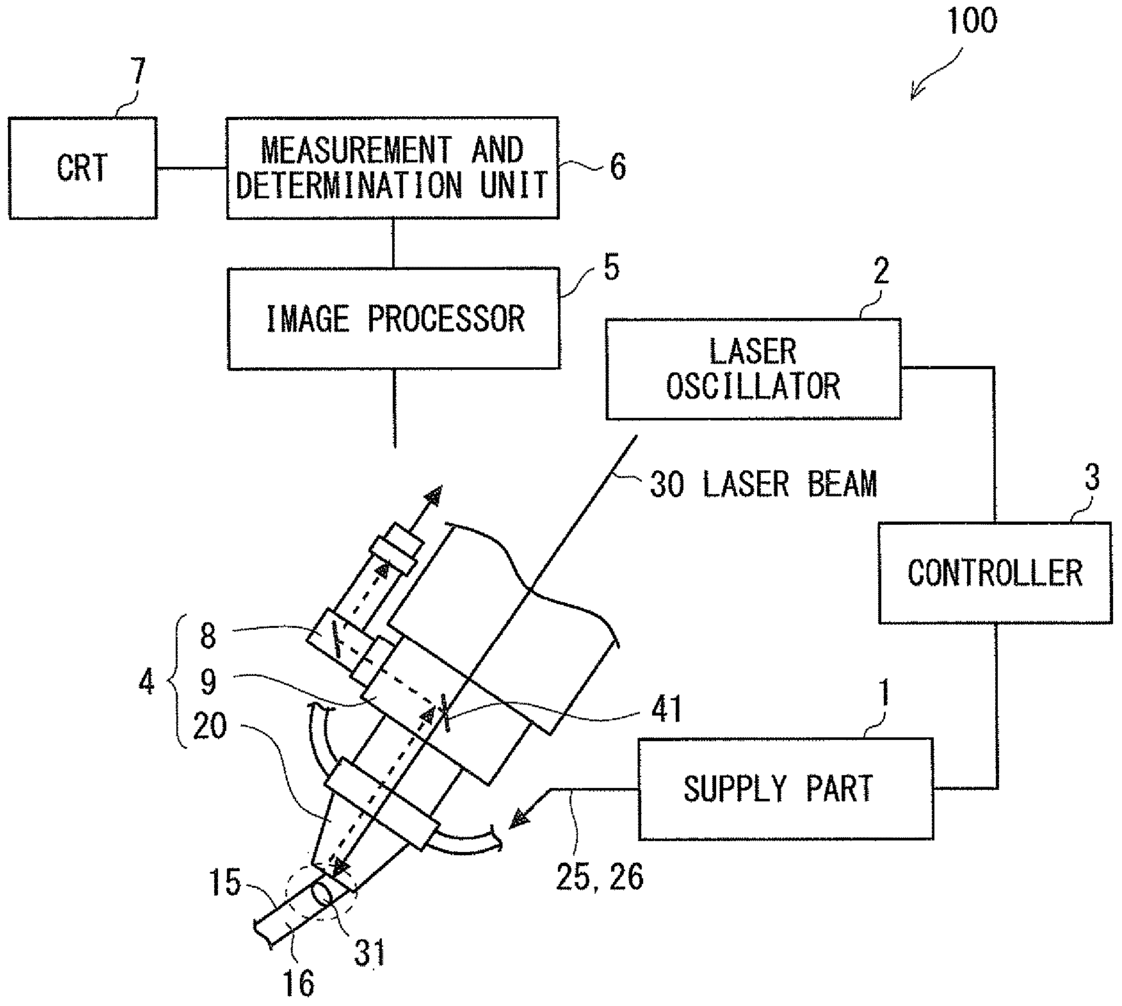
FIG. 1 is a configuration diagram that exemplifies a laser build-up apparatus according to a first embodiment.

FIG. 1 is a configuration diagram that exemplifies a laser build-up apparatus according to a first embodiment.

Referring to FIG. 1, a configuration of the laser build-up apparatus according to the first embodiment will be described. A laser build-up apparatus 100 includes a supply part 1, a laser oscillator 2, a controller 3, a laser processing part 4, an image processor 5, a measurement and determination unit 6, and a determination result display unit 7. The laser processing part 4 includes an image-capture unit 8, a case 9, and a laser clad head 20.

The supply part 1 supplies a metallic powder 26. The supply part 1 mixes a carrier gas 25 with the metallic powder 26 and supplies the metallic powder 26 together with the carrier gas 25 to the laser clad head 20. Further, the supply part 1 supplies a center gas 24 to the laser clad head 20. The center gas 24 and the carrier gas 25 are, for example, each an inactive gas such as nitrogen or argon. The metallic powder 26 includes, for example, copper powder.

The laser oscillator 2 outputs a laser beam 30. The laser beam 30 that is output passes through the case 9 and the laser clad head 20 and illuminates a processing point (melt pool 31).

The controller 3 controls supply and stop of supply of powder in the supply part 1 and output and stop of the laser in the laser oscillator 2. The controller 3 further controls the flow rate of the center gas 24 and the carrier gas 25, the supply amount of the metallic powder 26, and the output of the laser beam 30.

A beam splitter 41 is provided inside the case 9 of the laser processing part 4. The beam splitter 41 reflects a part of the light that has been input and transmits the other part of the light. The beam splitter 41 transmits a part of the laser beam 30 from the laser oscillator 2 to the side of the processing point (melt pool 31) and reflects the other part of the light from the melt pool 31 and the area around thereof to the side of the image-capture unit 8.

The laser clad head 20 is attached to the case 9. The laser clad head 20 emits the laser beam 30 that has transmitted the beam splitter 41 to the processing point. Further, the laser clad head 20 discharges the metallic powder 26 that has been supplied to the processing point. In this way, by irradiating the laser beam 30 while the metallic powder 26 is being supplied, a cladding layer 16 is formed. The melt pool 31 is formed on the surface of the cladding layer 16 opposed to the laser clad head 20. The laser clad head 20 delivers the light emitted from the melt pool 31 and the area around thereof to the beam splitter 41.

Figure 2:
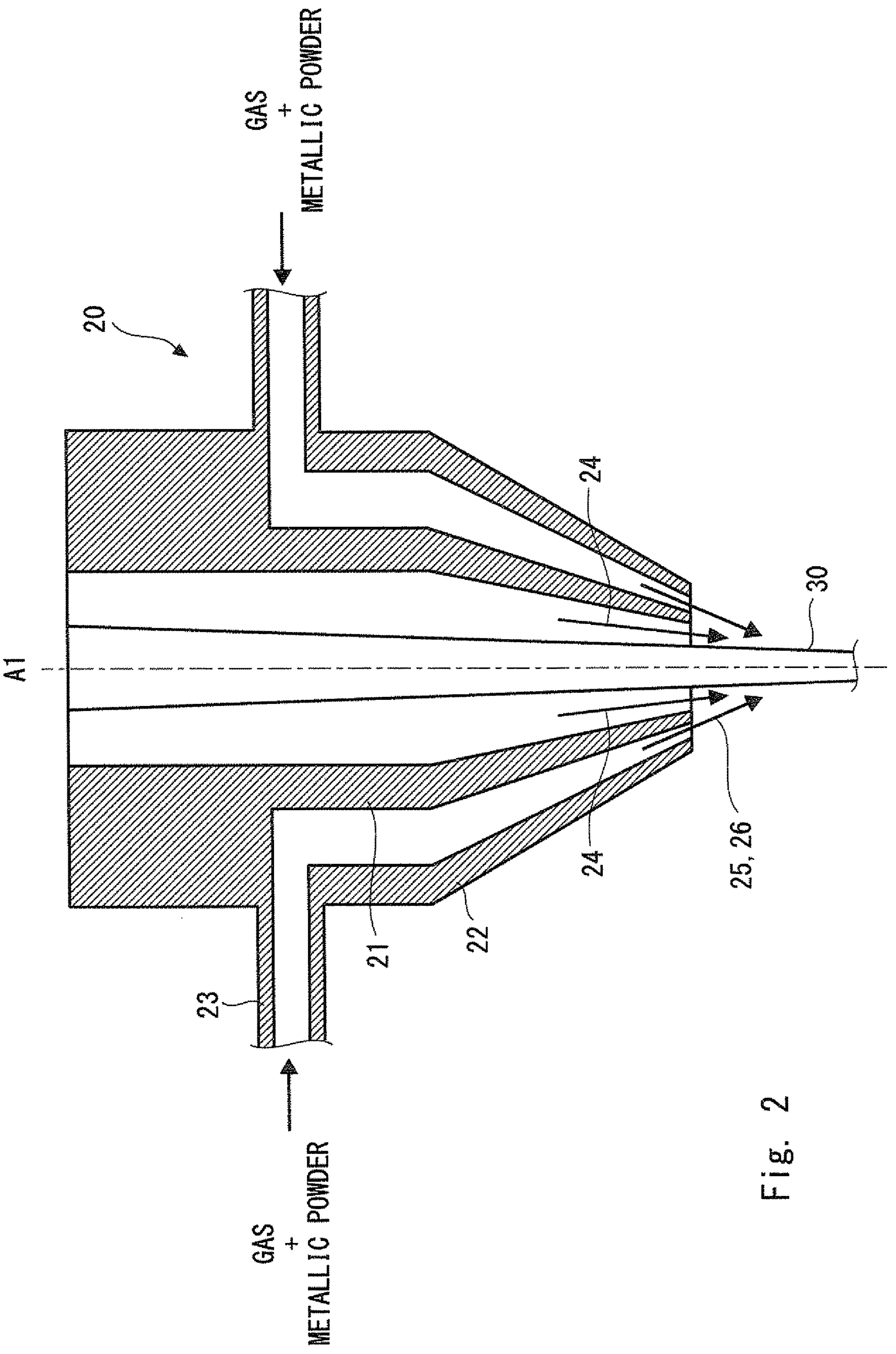
FIG. 2 is a cross-sectional view that exemplifies a laser clad head of the laser build-up apparatus according to the first embodiment.

FIG. 2 is a cross-sectional view that exemplifies the laser clad head of the laser build-up apparatus according to the first embodiment.

As shown in FIG. 2, the laser clad head 20 includes an inner nozzle 21, an outer nozzle 22, and a raw material supply pipe 23. Specifically, the laser clad head 20 has a coaxial double-tube structure including the inner nozzle 21 and the outer nozzle 22 both having an optical axis A1 of the laser beam 30 as a central axis.

The laser beam 30 is emitted from the inner nozzle 21. On the other hand, light to capture the image of the melt pool 31 and the area around thereof is input to the inner nozzle 21. Accordingly, the optical axis A1 of the laser beam 30 that illuminates the melt pool 31 and the optical axis of the light to capture the image of the melt pool 31 and the area around thereof coincide with each other in the laser clad head 20. The center gas 24 is discharged from the inner nozzle 21. Further, the carrier gas 25 and the metallic powder 26 supplied via the raw material supply pipe 23 are discharged from between the inner nozzle 21 and the outer nozzle 22. That is, the optical axis A1 of the laser beam 30 that illuminates the melt pool 31 and the optical axis of the light to capture the image of the melt pool 31 and the area around thereof coincide with the central axis of the inner nozzle 21 and the outer nozzle 22.

By integrating the functions of irradiating the laser beam 30 and supplying the center gas 24, the carrier gas 25, and the metallic powder 26, the size of the laser processing part 4 can be reduced. Further, since the optical axis of the laser beam 30 that illuminates the melt pool 31 and the optical axis of the light to capture the image of the melt pool 31 and the area around thereof coincide with each other in the laser clad head 20, the whole image of the melt pool 31 and the area around thereof can be captured.

As shown in FIG. 1, the image-capture unit 8 is attached to the case 9. The light emitted from the melt pool 31 and the area around thereof is reflected by the beam splitter 41 in the case 9 and then the image-capture unit 8 receives the reflected light. The image-capture unit 8 therefore captures the image of the melt pool 31 and the area around thereof. The image-capture unit 8 is, for example, a Charge-Coupled Device (CCD) camera.

The image processor 5 processes the image captured by the image-capture unit 8. For example, the image processor 5 creates a black-white contrast on the image by changing the intensity of brightness.

The measurement and determination unit 6 performs measurement and determination based on the image that has been processed. Accordingly, the measurement and determination unit 6 measures the sizes and the number of ball-shaped metallic powder aggregates (balls) absorbed in the melt pool 31 from the image that has been captured. The measurement and determination unit 6 further measures the number of holes in the cladding layer 16. The measurement and determination unit 6 further calculates the area of the balls for each contrast created by the image processor 5.

The determination result display unit 7 displays the image that has been captured and the image that has been processed. The determination result display unit 7 further displays the sizes and the number of balls that have been measured. The determination result display unit 7 further displays the number of holes. The determination result display unit 7 further displays the result of determining the quality of the cladding layer 16 that has been measured. The determination result display unit 7 is, for example, a Cathode Ray Tube (CRT).

Figure 3:
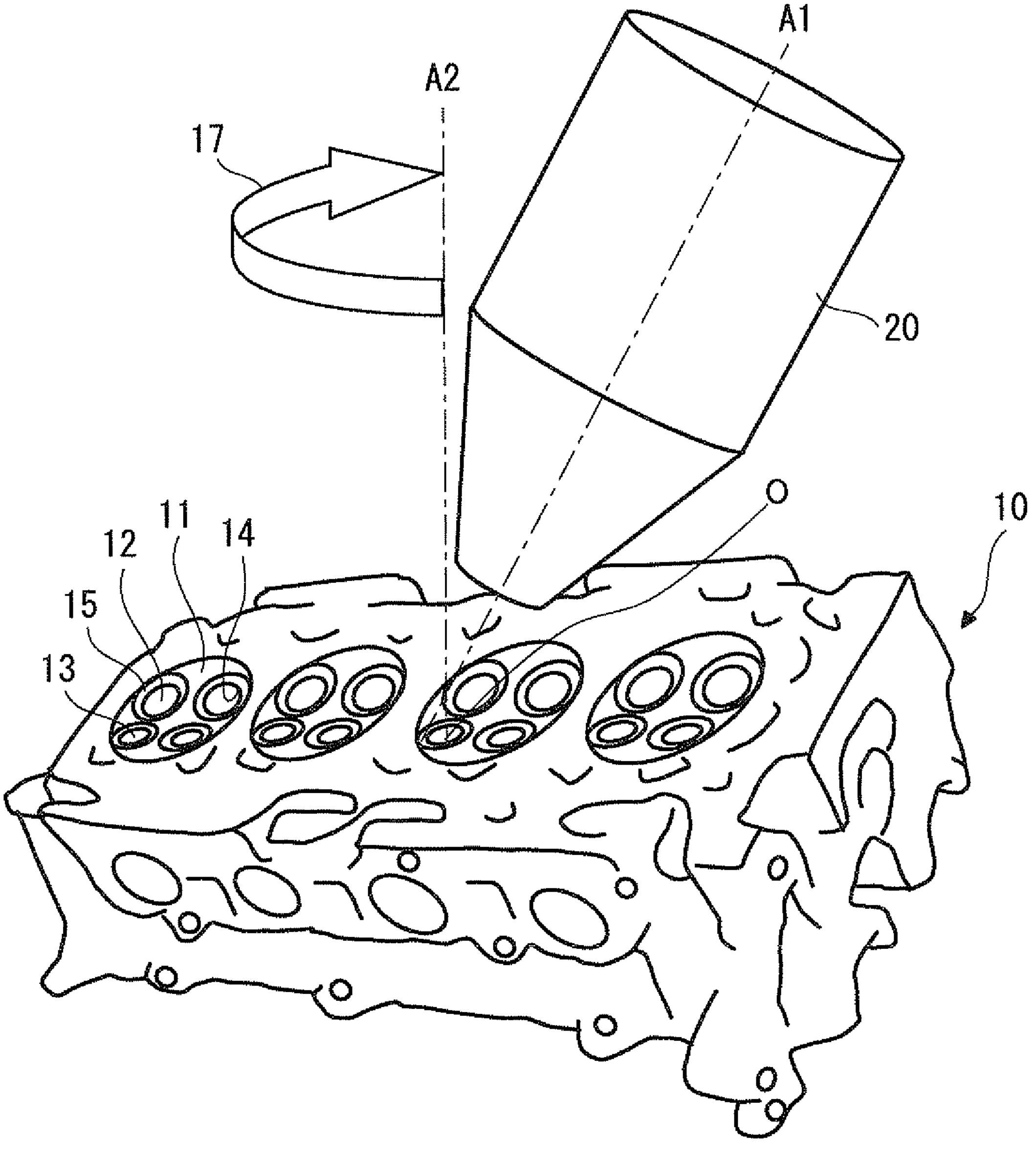
FIG. 3 is a perspective view that exemplifies a laser build-up method according to the first embodiment.

FIG. 3 is a perspective view that exemplifies a laser build-up method according to the first embodiment.

Referring to FIG. 3, a cylinder head roughly formed material 10 will be described. The cylinder head roughly formed material 10 is casting formed of, for example, cast iron or aluminum alloy. The cylinder head roughly formed material 10 includes a plurality of combustion chambers 11. Each of the combustion chambers 11 includes an inlet port 12 and an outlet port 13. In each of the inlet port 12 and the outlet port 13, an annular counter sunk groove 15 that surrounds an opening 14 is formed along the periphery of the opening 14 on the side of the combustion chamber 11. The counter sunk groove 15 is formed by machine processing.

The cylinder head roughly formed material 10 shown in FIG. 3 is for 4-cylinder, 16-valve engines and includes two inlet ports 12 and two outlet ports 13 in each of the four combustion chambers 11. As a matter of course, the number of combustion chambers 11, the number of inlet ports 12, and the number of outlet ports 13 are not limited to those shown in the example of FIG. 3 and are determined as appropriate.

Next, an operation of the laser build-up apparatus 100 according to this embodiment will be described. Regarding this operation, the method of forming the cladding layer 16, the method of capturing the image of the melt pool 31, the method of measuring the ball 18 in the image that has been captured, and the method of determining the quality of the cladding layer 16 will be separately explained. First, the method of forming the cladding layer 16 will be described.

As shown in FIG. 1, the controller 3 causes the supply part 1 to mix the carrier gas 25 with the metallic powder 26. The controller 3 further causes the laser oscillator 2 to start operation. The controller 3 controls the supply part 1 and causes the supply part 1 to supply the carrier gas 25 in which the center gas 24 and the metallic powder 26 are mixed to the laser clad head 20. At the same time, the controller 3 controls the laser oscillator 2 and causes the laser oscillator 2 to emit the laser beam 30 to the case 9. The controller 3 matches the timing of the supply of the metallic powder 26 with the emission of the laser beam 30. The laser beam 30 emitted to the case 9 passes through the case 9 and reaches the beam splitter 41. The beam splitter 41 allows a part of the laser beam 30 to pass therethrough.

As shown in FIGS. 1 and 2, the center gas 24 supplied to the laser clad head 20 is discharged from the inner nozzle 21. The carrier gas 25 and the metallic powder 26 are discharged to the inside of the counter sunk groove 15 from between the inner nozzle 21 and the outer nozzle 22. On the other hand, the laser beam 30 that has been transmitted through the beam splitter 41 passes through the inner nozzle 21 of the laser clad head 20 and illuminates the processing point (melt pool 31) inside the counter sunk groove 15.

As stated above, the laser build-up apparatus 100 irradiates the laser beam 30 (optical axis A1) while supplying the metallic powder 26 to the counter sunk groove 15 from the supply part 1. Accordingly, the metallic powder 26 is melted and solidified inside the counter sunk groove 15 and the cladding layer 16 for the valve seat is formed. The melt pool 31 is formed on the surface of the cladding layer 16 opposed to the laser beam 30.

As shown in FIG. 3, the laser clad head 20 is rotated about a central axis A2 of the annular counter sunk groove 15. In this way, the cladding layer 16 is formed along the full circumference of the counter sunk groove 15. The direction in which the laser clad head 20 is moved is referred to as a processing direction 17. Further, the central axis A2 is an axis that is vertical to two diameters that are perpendicular to each other in the circle formed by the annular form of the counter sunk groove 15 and passes through a center O, which is the center of the circle.

Next, the method of capturing the image of the melt pool 31 will be described.

As shown in FIG. 1, among the light beams emitted from the melt pool 31 and the area around thereof, the light to capture the image passes through the laser clad head 20 and reaches the beam splitter 41. In this way, the optical axis of the laser beam 30 that illuminates the melt pool 31 and the optical axis of the light to capture the image of the melt pool 31 and the area around thereof are made coincident with each other in the laser clad head 20.

The light to capture the image includes, besides the light emitted from the melt pool 31, light emitted and reflected from the metallic powder aggregates that exist near the melt pool 31. The beam splitter 41 reflects a part of the light from the melt pool 31 and the area around thereof. The reflected light reaches the image-capture unit 8. The image-capture unit 8 therefore captures the image of the melt pool 31 and the area around thereof while the cladding layer 16 is being formed. The image captured by the image-capture unit 8 is processed by the image processor 5.

Figure 4:
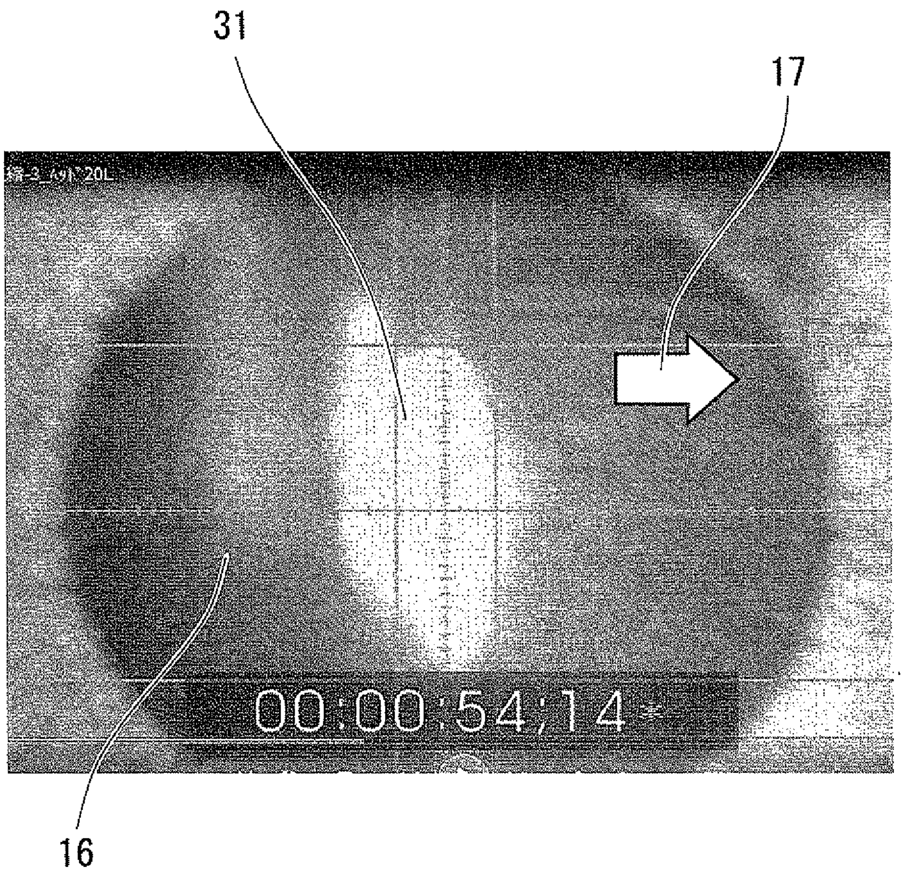
FIG. 4 is a photo that exemplifies a melt pool and an area around thereof in the laser build-up apparatus according to the first embodiment.
Figure 5:
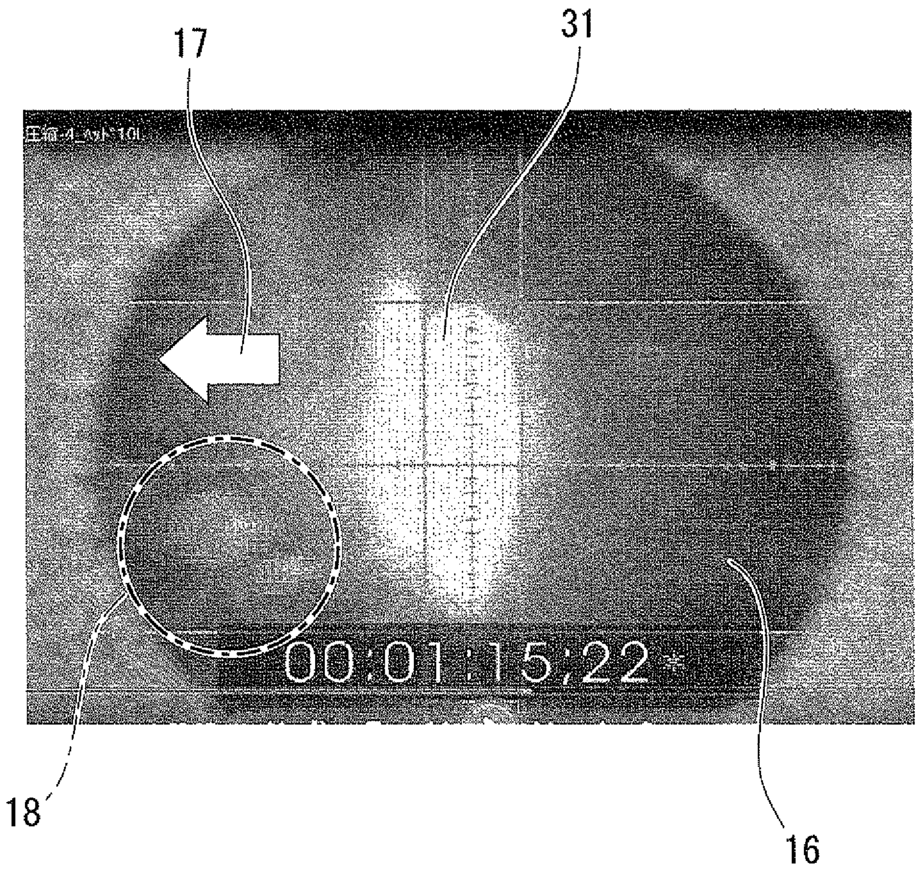
FIG. 5 is a photo that exemplifies the melt pool and the area around thereof in the laser build-up apparatus according to the first embodiment.

FIGS. 4 and 5 are photos that exemplify the melt pool and the area around thereof in the laser build-up apparatus according to the first embodiment.

As shown in FIG. 4, the melt pool 31 is formed on the tip of the cladding layer 16 in the process of forming the cladding layer 16. There is no ball 18 (not shown) and no metallic powder aggregate at the front of the processing direction 17 of the melt pool 31. The ball 18 means the metallic powder aggregates that form a ball shape.

On the other hand, as shown in FIG. 5, there is a ball 18 at the front of the processing direction 17 of the melt pool 31. The ball 18 causes an internal defect of the cladding layer 16. In this way, the image-capture unit 8 captures the image of the melt pool 31 and the area around thereof while the cladding layer 16 is being formed. Further, the image-capture unit 8 captures the image of the ball-shaped metallic powder aggregates (balls 18) absorbed in the melt pool 31.

Figure 6:
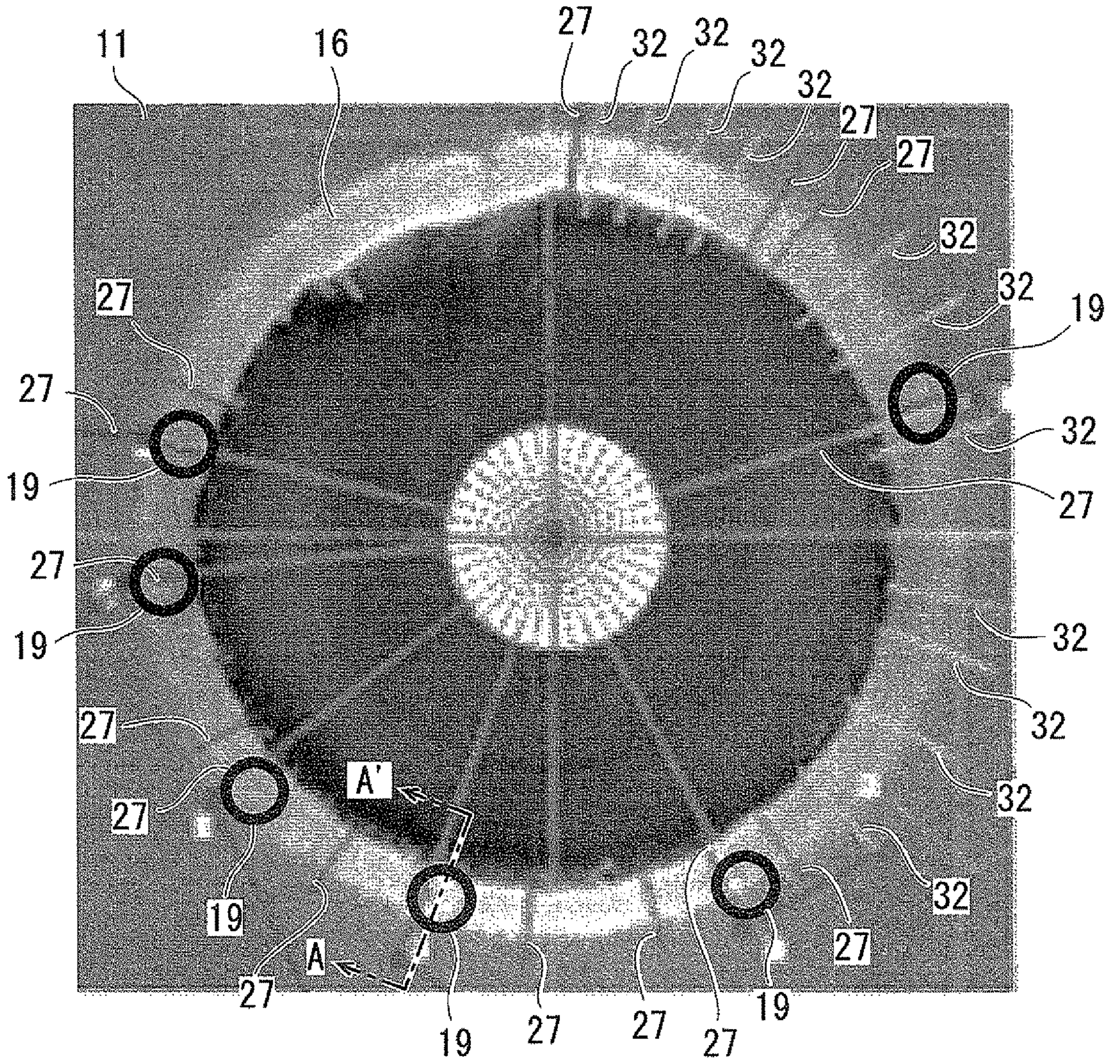
FIG. 6 is a photo that exemplifies a CT image having a circular cross section when a cladding layer formed by the laser build-up apparatus according to the first embodiment is seen from a side of a combustion chamber.

FIG. 6 is a photo that exemplifies a CT image having a circular cross section when the cladding layer formed by the laser build-up apparatus according to the first embodiment is seen from the side of the combustion chamber.

As shown in FIG. 6, the hole 19 is observed (in the circle 19) in the circular cross section when the cladding layer 16 is seen from the side of the combustion chamber 11. The part in which the hole 19 was observed corresponds to the part that has sucked the ball 18 (ball sucking part 27) when the melt pool 31 was observed. On the other hand, the part in which the hole 19 was observed does not necessarily correspond to the part that has sucked the metallic powder aggregates (sucking part 32 of the metallic powder aggregates) when the melt pool 31 was observed.

Figure 7:
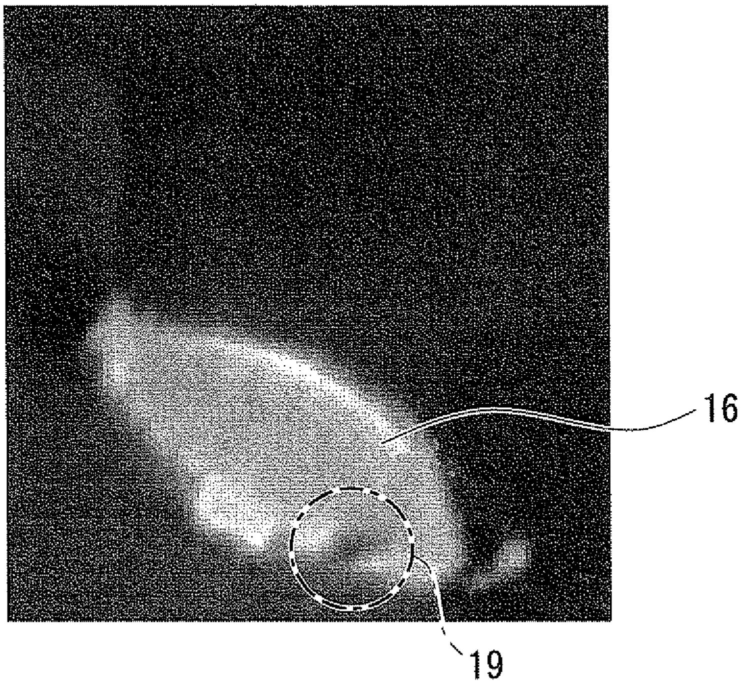
FIG. 7 is a photo that exemplifies a CT image having a cross section taken along the line A-A' of FIG. 6.

FIG. 7 is a photo that exemplifies a CT image having a cross section taken along the line A-A' shown in FIG. 6.

As shown in FIG. 7, in the part in which the hole 19 was observed on the CT image having a circular cross section of the cladding layer 16, the hole 19 is observed. In this way, in the laser build-up apparatus 100 according to this embodiment, it is possible to make the part in which the hole 19 was observed correspond to the ball sucking part 27.

Next, the method of measuring the ball 18 on the captured image will be described.

As shown in FIG. 1, the image processed by the image processor 5 is transmitted to the measurement and determination unit 6. The measurement and determination unit 6 measures the sizes and the number of balls 18 (ball-shaped metallic powder aggregates) absorbed in the melt pool 31 from the captured image. The results are displayed on the determination result display unit 7. The quality of the cladding layer 16 is determined based on the sizes and the number of metallic powder aggregates.

Figure 8:
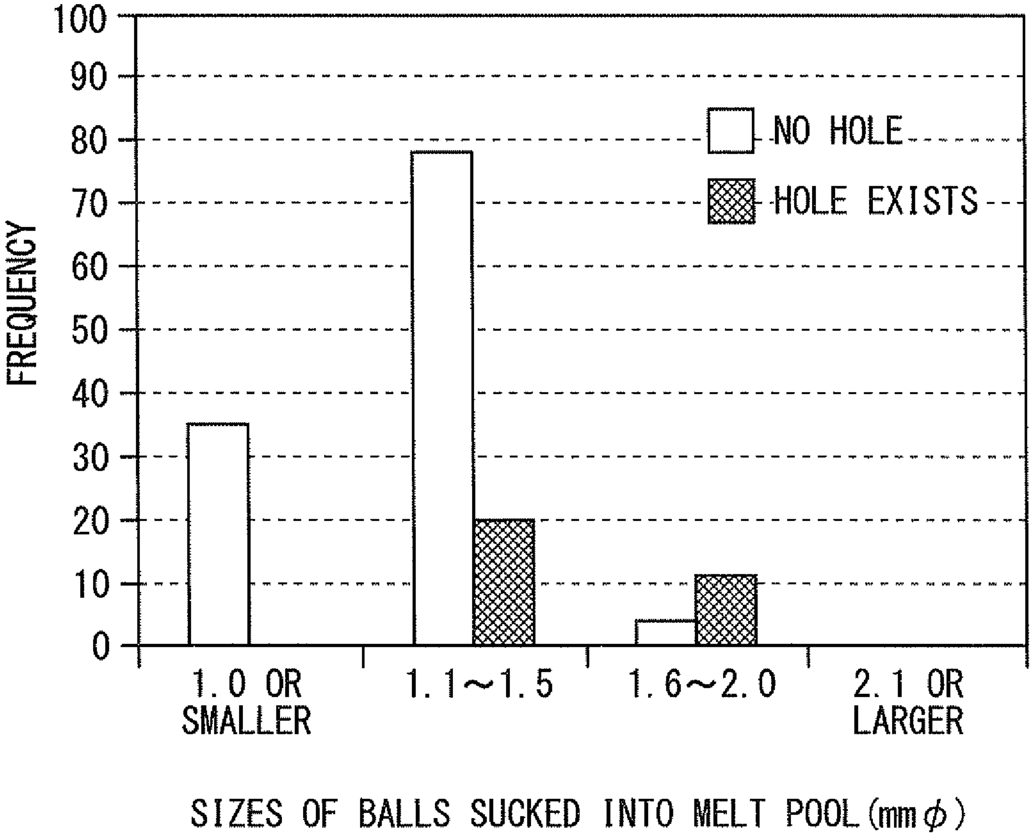
FIG. 8 is a graph in which a correlation of the sizes of balls sucked into the melt pool and the presence or the absence of holes inside the cladding layer is exemplified in the laser build-up apparatus according to the first embodiment, with a horizontal axis representing the sizes of the balls sucked into the melt pool and a vertical axis representing the frequency.

FIG. 8 is a graph that exemplifies a correlation of the sizes of the balls sucked into the melt pool and the presence or the absence of the hole inside the cladding layer in the laser build-up apparatus according to the first embodiment. In this graph, the horizontal axis represents the sizes of the balls sucked into the melt pool and the vertical axis represents the frequency. The white column presents the summary of the results of the cladding layer 16 in which the hole 19 was not observed. On the other hand, the black column presents the summary of the results of the cladding layer 16 in which the hole 19 was observed.

As shown in FIG. 8, in the cladding layer 16 (white column) in which the hole 19 was not observed, there are 35 balls 18 having the size of 1.0 mmϕ or smaller, 78 balls 18 having the size of 1.1 to 1.5 mmϕ, and 4 balls 18 having the size of 1.6 to 2.0 mmϕ. On the other hand, in the cladding layer 16 (black column) in which the hole 19 was observed, there is no ball 18 having the size of 1.0 mmϕ or smaller, 20 balls 18 having the size of 1.1 to 1.5 mmϕ, and 10 balls 18 having the size of 1.6 to 2.0 mmϕ. In this way, the number of balls 18 having the size of 1.6 to 2.0 mmϕ in the black column (the cladding layer 16 in which the hole 19 was observed) is larger than the number of balls in the white column (the cladding layer 16 in which the hole 19 was not observed). That is, the rate of occurrence of the hole increases as the sizes of the balls 18 increase.

Next, the method of determining the quality of the cladding layer 16 will be described.

Figure 9:
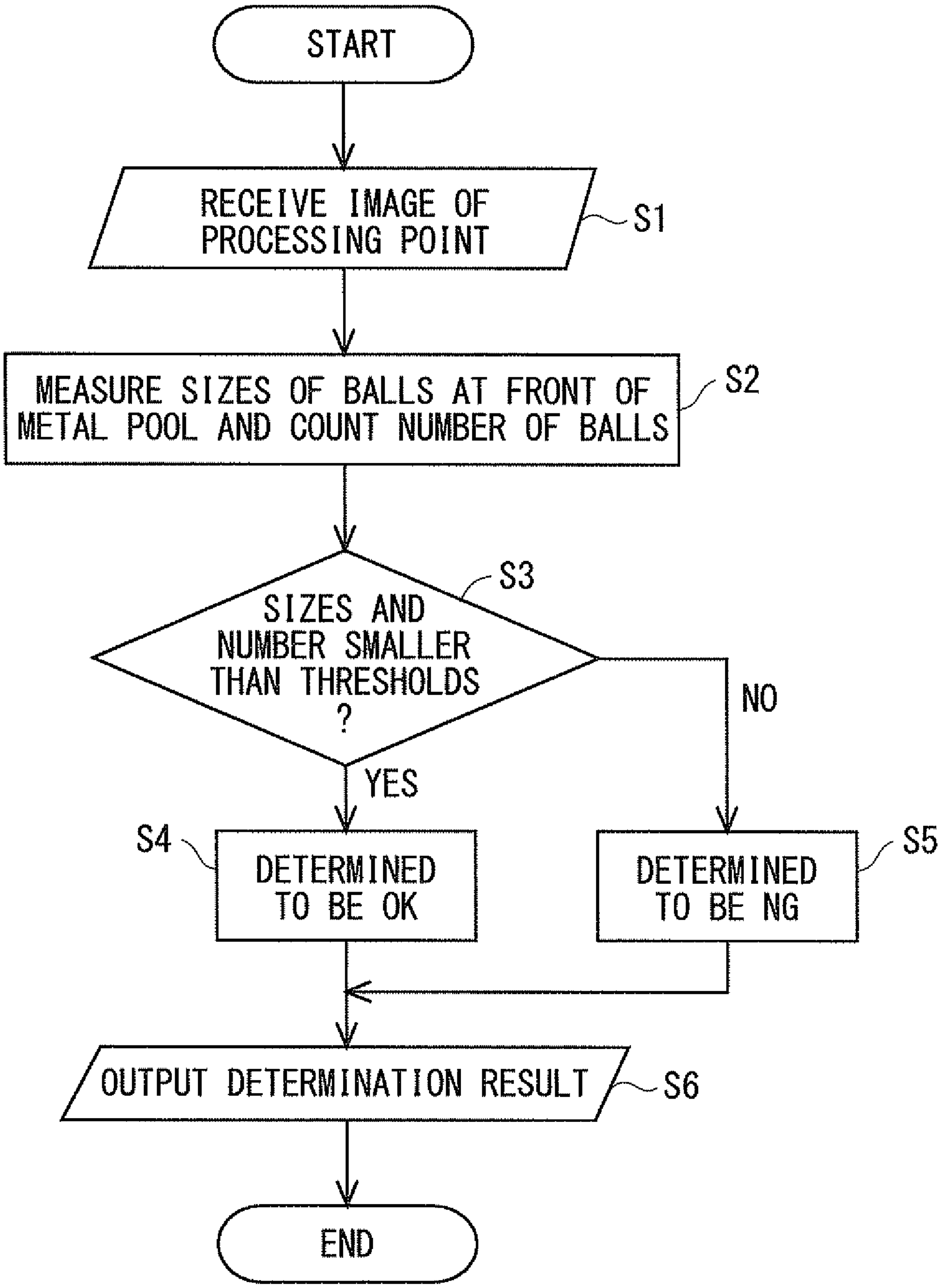
FIG. 9 is a flowchart that exemplifies a method of determining a quality of the cladding layer in the laser build-up apparatus according to the first embodiment.

FIG. 9 is a flowchart that exemplifies the method of determining the quality of the cladding layer in the laser build-up apparatus according to the first embodiment.

As shown in Step S1 of FIG. 9, first, the measurement and determination unit 6 receives an image of the processing point (melt pool 31) processed by the image processor 5. The measurement and determination unit 6 receives, for example, an image in which black-white contrast is created according to the brightness.

Next, as shown in Step S2, the sizes of the balls 18 observed at the front of the processing direction of the melt pool 31 are measured and the number of balls 18 is counted. The measurement of the sizes of the balls is performed, for example, by measuring the area of the contrasted image.

Next, as shown in Step S3, it is determined whether the sizes of the balls 18 that have been measured and the number of balls 18 that has been counted are smaller than thresholds in the quality criterion. When the sizes of the balls 18 that have been measured and the number of balls 18 that has been counted are smaller than the thresholds (Yes), the process goes to Step S4. When the sizes of the balls 18 and the number of balls 18 are larger than the thresholds (No), the process goes to Step S5.

Next, when the sizes of the balls 18 that have been measured and the number of balls 18 that has been counted are smaller than the thresholds as shown in Step S4, the cladding layer 16 that has been formed is determined to be OK, which means it is a non-defective product. The process then goes to Step S6.

On the other hand, when the sizes of the balls 18 that have been measured and the number of balls 18 that has been counted are larger than the thresholds as shown in Step S5, the cladding layer 16 that has been formed is determined to be NG, which means it is a defective product. The process then goes to Step S6.

Next, as shown in Step S6, the result of the determination is output. The determination result is output, for example, to the determination result display unit 7.

In this way, the quality of the cladding layer 16 is measured based on the sizes and the number of balls 18 that have been measured.

Next, one example of the quality criterion in the method of determining the quality of the cladding layer 16 will be described.

Figure 10:
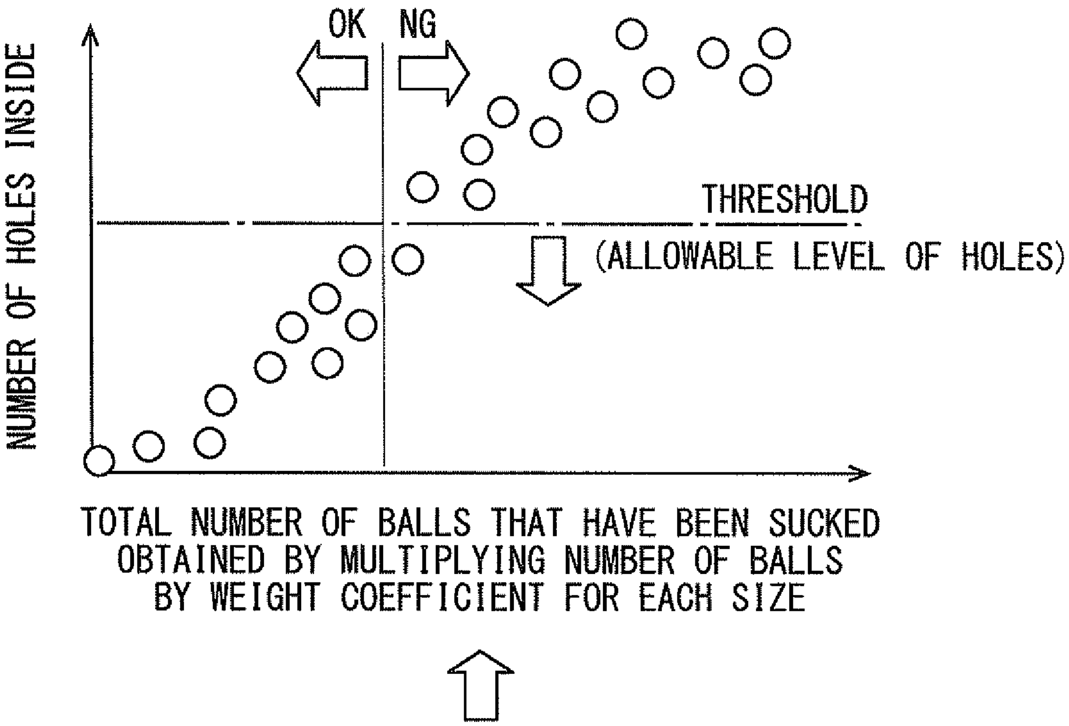
FIG. 10 is a diagram that exemplifies a quality criterion of the cladding layer formed by the laser build-up apparatus according to the first embodiment.

FIG. 10 is a diagram that exemplifies the quality criterion of the cladding layer formed by the laser build-up apparatus according to the first embodiment.

As shown in FIG. 10, the correlation relationship between the sizes and the number of balls 18 absorbed in the melt pool 31 and the number of holes 19 that exist in the cladding layer 16 is obtained in advance. In order to obtain the correlation relationship, first, the sizes and the number of balls 18 absorbed in the melt pool 31 when the cladding layer 16 is formed are observed. Then the total number of balls 18 is calculated from the sizes and the number of balls 18 that have been observed. The total number of balls 18 means the total number of balls 18 that have been sucked and is obtained by multiplying the number of balls 18 by a weight coefficient for each size of the balls 18. The total number of balls 18 can be obtained, for example, from the following equation (1).

$$X(\text{Total Number})=C1\times N1+C2\times N2+C3\times N3+ \quad (1)$$

The symbol Ci is a weight coefficient for each size of the balls 18 and the coefficient becomes larger as the sizes of the balls 18 becomes larger. The symbol Ni denotes the number of balls 18.

In this way, the total number of balls is obtained. Next, the number of holes 19 that exist inside the cladding layer 16 that has been observed is obtained. The number of holes 19 is observed, for example, by a CT image. Then a scatter diagram in which the horizontal axis represents the total number of balls 18 and the vertical axis represents the number of holes 19 that exist inside the cladding layer 16 is created. The total number of balls 18 and the number of holes 19 obtained by observing some cladding layers 16 are plotted in the scatter diagram. These plots exhibit a positive correlation relationship. In this way, the correlation relationship between the sizes and the number of balls 18 and the number of holes 19 that exist in the cladding layer 16 is obtained.

Next, the method of determining the quality of the cladding layer 16 using this correlation relationship will be described.

One factor to determine the quality of the cladding layer 16 is the number of holes 19 that exist inside the cladding layer 16. First, as shown in FIG. 10, an allowable level of the holes 19 that exist in the cladding layer 16 is set to be a threshold. The cladding layer 16 in which the number of holes 19 is equal to or smaller than the threshold is a non-defective product. The cladding layer 16 in which the number of holes 19 exceeds the threshold is a defective product. Next, the total number of balls 18 corresponding to the threshold is set using the correlation relationship that has been obtained. The cladding layer 16 in which the total number of balls 18 is equal to or smaller than the number of balls that has been set is determined to be OK, which means it is a non-defective product. On the other hand, the cladding layer in which the total number of balls 18 exceeds the number of balls that has been set is determined to be NG, which means it is a defective product.

That is, it is determined that the quality of the cladding layer 16 becomes higher as the sizes and the number of balls 18 that have been sucked into the melt pool 31 become smaller. In contrast, it is determined that the quality of the cladding layer 16 becomes lower as the sizes and the number of balls 18 that have been sucked into the melt pool 31 become larger. In this way, the determination is carried out according to the criterion of the quality of the cladding layer 16.

Next, effects of the quality determination method using the laser build-up apparatus according to this embodiment will be described.

The quality determination method according to this embodiment includes the process of measuring the sizes and the number of balls 18 (ball-shaped metallic powder aggregates) absorbed in the melt pool 31 from the captured image and the process of determining the quality of the cladding layer 16 based on the sizes and the number of balls 18 that have been measured. It is possible to accurately predict the occurrence of the holes formed by the balls 18 based on the sizes and the number of balls 18 (ball-shaped metallic powder aggregates) that have been measured. It is therefore possible to accurately determine the quality of the cladding layer 16.

Further, in this embodiment, it is possible to determine the quality of the internal part of the cladding layer 16 which cannot be detected from a visual inspection in real time and in a non-destructive manner.

In Japanese Unexamined Patent Application Publication No. 09-192861, the presence or the absence of an abnormality in the cladding layer is determined by observing the intensity of light emitted from the melt pool. In the method disclosed in Japanese Unexamined Patent Application Publication No. 09-192861, it is possible to estimate an excess or deficiency of heat from the intensity of light emitted from the melt pool. It is impossible, however, to predict the occurrence of holes. Accordingly, it is impossible to accurately determine the quality of the cladding layer.

Unlike Japanese Unexamined Patent Application Publication No. 09-192861, in this embodiment, the phenomenon which causes the hole 19 to occur inside the cladding layer 16 is captured from the image of the melt pool 31 and the area around thereof while the cladding layer 16 is being formed. Accordingly, it is possible to determine the quality of the internal part of the cladding layer 19 (the presence of the large hole 19), which is difficult to achieve in the related art.

Second Embodiment

Next, a laser build-up method according to a second embodiment will be described. In this embodiment, the image-capture unit 8 is separated from the case 9.

Figure 11:
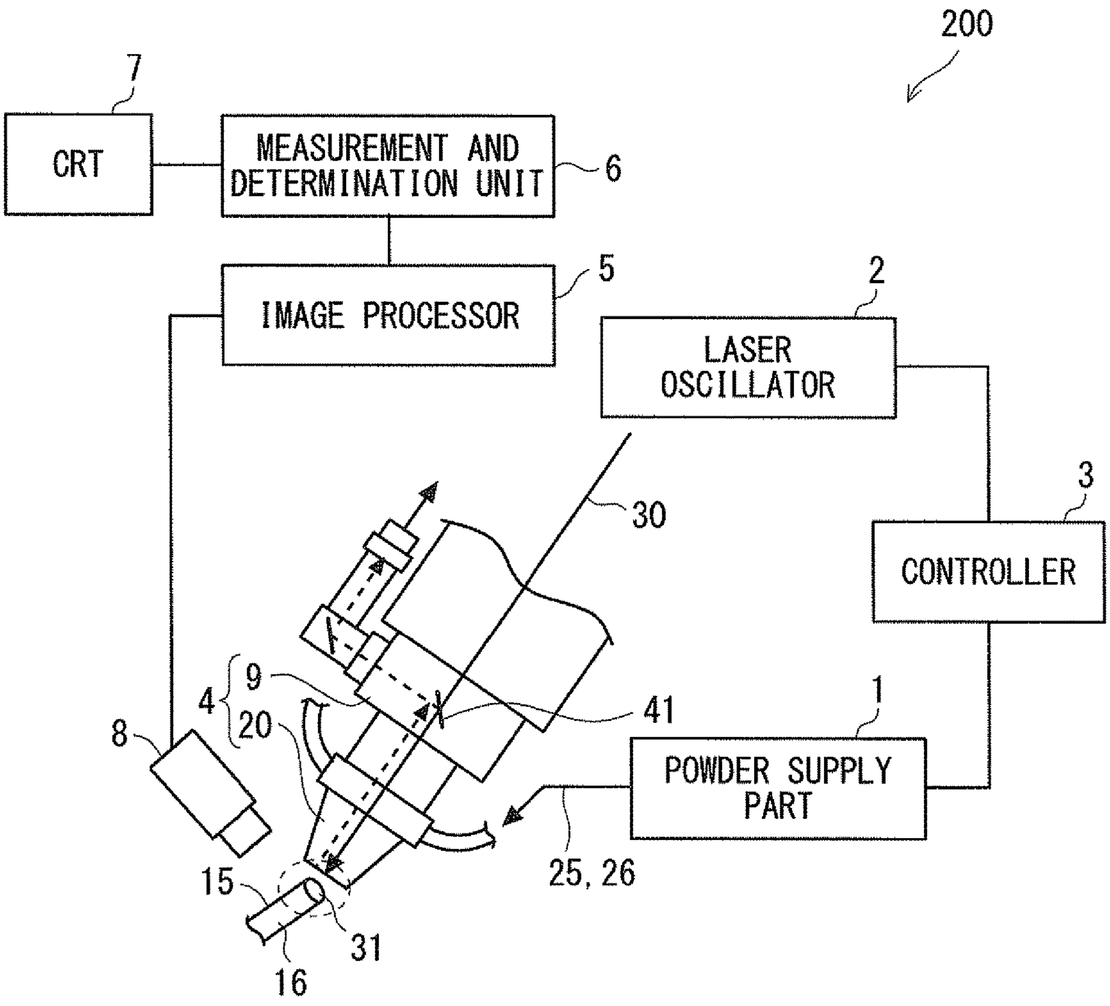
FIG. 11 is a configuration diagram that exemplifies a laser build-up apparatus according to a second embodiment.

FIG. 11 is a configuration diagram that exemplifies a laser build-up apparatus according to a second embodiment.

As shown in FIG. 11, in a laser build-up apparatus 200, the image-capture unit 8 is separated from the case 9. The light emitted from the melt pool 31 and the area around thereof is not received through the laser clad head 20. As a result, the optical axis A1 of the laser beam 30 that illuminates the melt pool 31 and the optical axis of the light to capture the image of the melt pool 31 and the area around thereof do not coincide with each other. The determination is carried out based on the image captured by the image-capture unit 8. Since the other configurations are similar to those of the first embodiment, the descriptions thereof will be omitted.

In the laser build-up apparatus 200 according to this embodiment, it is difficult to capture the whole image of the melt pool 31 and the area around thereof. Therefore, compared to the configuration in which the image is taken from the direction coaxial to the direction of the laser beam 30 as in the first embodiment, the quality determination accuracy decreases. However, there is a large freedom with regard to selecting the part to be captured. It is therefore possible to capture the image of a desired part.

While the embodiments of the apparatus of determining the quality of the cladding layer and the laser build-up apparatus according to the present invention have been described above, the present invention is not limited to the above configurations and may be changed without departing from the spirit of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of determining a quality of a cladding layer formed by irradiating a laser beam while a metallic powder is being supplied, the method comprising:

a process of capturing an image of a melt pool and an area around thereof while the cladding layer is being formed;

a process of measuring the sizes and the number of ball-shaped metallic powder aggregates absorbed in the melt pool from the image that has been captured; and a process of determining the quality of the cladding layer based on the sizes and the number that have been measured, wherein the ball-shaped metallic powder aggregates are aggregates of excess metallic powder formed when the laser beam comes close to the excess metallic powder.

2. The method of determining the quality of the cladding layer according to claim 1, wherein an optical axis of the laser beam that illuminates the melt pool is made coincident with an optical axis of light to capture the image of the melt pool and the area around thereof.

3. The method of determining the quality of the cladding layer according to claim 1, wherein in the process of determining the quality of the cladding layer, the quality of the cladding layer is determined based on the total number of ball-shaped metallic powder aggregates that have been absorbed in the melt pool and is obtained by multiplying the number of ball-shaped metallic powder aggregates by a weight coefficient for each size of the ball-shaped metallic powder aggregates.

4. A laser build-up apparatus comprising:

a supply part that supplies a metallic powder; and a laser oscillator that outputs a laser beam, wherein:

a cladding layer is formed by irradiating the laser beam while the metallic powder is being supplied from the supply part, the laser build-up apparatus further comprises:

a camera that captures an image of a melt pool and an area around thereof; and a processor configured to act as a measurement unit that measures the sizes and the number of ball-shaped metallic powder aggregates absorbed in the melt pool from the image that has been captured, and a quality of the cladding layer is determined based on the sizes and the number of the metallic powder aggregates, wherein the ball-shaped metallic powder aggregates are aggregates of excess metallic powder formed when the laser beam comes close to the excess metallic powder.

5. The laser build-up apparatus according to claim 4, further comprising a nozzle having a central axis, wherein an optical axis of the laser beam that illuminates the melt pool and an optical axis of light to capture the image of the melt pool and the area around thereof coincide with the central axis.

6. The laser build-up apparatus according to claim 4, wherein the quality of the cladding layer is determined based on the total number of ball-shaped metallic powder aggregates that have been absorbed in the melt pool and is obtained by multiplying the number of ball-shaped metallic powder aggregates by a weight coefficient for each size of the ball-shaped metallic powder aggregates.

* * * * *